(12) United States Patent
Palzewicz et al.

(10) Patent No.: US 10,226,908 B2
(45) Date of Patent: Mar. 12, 2019

(54) NONWOVEN APERTURED ELASTIC FILM WITH IMPROVED BONDING FEATURES

(71) Applicant: Kimberly-Clark Worldwide, Inc., Neenah, WI (US)

(72) Inventors: David A. Palzewicz, Canton, GA (US); Steven W. Fitting, Acworth, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 15/531,520

(22) PCT Filed: Dec. 19, 2014

(86) PCT No.: PCT/US2014/071507
§ 371 (c)(1),
(2) Date: May 30, 2017

(87) PCT Pub. No.: WO2016/099549
PCT Pub. Date: Jun. 23, 2016

(65) Prior Publication Data
US 2017/0326832 A1    Nov. 16, 2017

(51) Int. Cl.
*B32B 3/26* (2006.01)
*B32B 5/02* (2006.01)
(Continued)

(52) U.S. Cl.
CPC .............. *B32B 3/266* (2013.01); *B32B 5/022* (2013.01); *B32B 7/045* (2013.01); *B32B 25/042* (2013.01); *B32B 25/08* (2013.01); *B32B 25/10* (2013.01); *B32B 25/14* (2013.01); *B32B 27/08* (2013.01); *B32B 27/12* (2013.01); *B32B 27/302* (2013.01); *B32B 27/306* (2013.01); *B32B 27/308* (2013.01); *B32B 27/32* (2013.01); *B32B 27/34* (2013.01); *B32B 27/40* (2013.01); *B32B 2262/02* (2013.01); *B32B 2262/0253* (2013.01); *B32B 2262/0261* (2013.01);
(Continued)

(58) Field of Classification Search
CPC ......... B32B 3/266; B32B 5/022; B32B 7/045; B32B 2555/02; A61F 2013/15552; A61F 13/49; A61F 13/495; A61F 13/496; A61F 13/15203; A61F 13/49007–13/49019; A61F 2013/49034; A61F 2013/49057; Y10T 428/24322; Y10T 428/24298; Y10T 428/24612
See application file for complete search history.

(56) References Cited

U.S. PATENT DOCUMENTS 3,047,445 A    7/1962   Gresham
4,379,192 A    4/1983   Wahlquist et al.
(Continued)

FOREIGN PATENT DOCUMENTS

CN    1133620 A    10/1996
CN    1270556 A    10/2000
(Continued)

*Primary Examiner* — Joanna Pleszczynska
(74) *Attorney, Agent, or Firm* — Kimberly-Clark Worldwide, Inc.

(57) ABSTRACT

The present invention relates to a nonwoven composite comprising an elastic film bonded to a nonwoven web at a plurality of strategic, geometric bond points to provide a tactile pattern, enhanced breathability and comfort to the end user.

17 Claims, 8 Drawing Sheets

(51) Int. Cl.
*B32B 7/04* (2006.01)
*B32B 27/12* (2006.01)
*B32B 25/04* (2006.01)
*B32B 25/08* (2006.01)
*B32B 25/10* (2006.01)
*B32B 25/14* (2006.01)
*B32B 27/08* (2006.01)
*B32B 27/30* (2006.01)
*B32B 27/32* (2006.01)
*B32B 27/34* (2006.01)
*B32B 27/40* (2006.01)

(52) U.S. Cl.
CPC . *B32B 2262/0276* (2013.01); *B32B 2262/062* (2013.01); *B32B 2270/00* (2013.01); *B32B 2274/00* (2013.01); *B32B 2307/51* (2013.01); *B32B 2307/724* (2013.01); *B32B 2437/00* (2013.01); *B32B 2555/02* (2013.01)

(56) References Cited

U.S. PATENT DOCUMENTS

| | | |
|---|---|---|
| 5,207,962 A | 5/1993 | Hovis et al. |
| 5,226,992 A | 7/1993 | Morman |
| 5,620,779 A | 4/1997 | Levy et al. |
| 5,964,742 A | 10/1999 | McCormack et al. |
| 6,106,925 A | 8/2000 | Palumbo |
| 2001/0008683 A1 | 7/2001 | Takai et al. |
| 2002/0016122 A1 | 2/2002 | Curro et al. |
| 2003/0028165 A1 | 2/2003 | Curro et al. |
| 2004/0191486 A1 | 9/2004 | Underhill et al. |
| 2004/0241399 A1 | 12/2004 | Marmon et al. |
| 2005/0095943 A1 | 5/2005 | Griffin et al. |
| 2008/0095978 A1 | 4/2008 | Siqueira et al. |
| 2008/0132866 A1 | 6/2008 | Siqueira et al. |
| 2012/0251771 A1* | 10/2012 | Wilson .................. B32B 3/266 428/137 |
| 2014/0296815 A1 | 10/2014 | Takken |

FOREIGN PATENT DOCUMENTS

| | | |
|---|---|---|
| CN | 1897906 A | 1/2007 |
| CN | 101389237 A | 3/2009 |
| CN | 102395464 A | 3/2012 |
| CN | 103434239 A | 12/2013 |
| CN | 103502004 A | 1/2014 |
| CN | 103764088 A | 4/2014 |
| WO | WO 2005/060674 A2 | 7/2005 |
| WO | WO 2012/036599 A1 | 3/2012 |
| WO | WO 2012/036600 A1 | 3/2012 |

* cited by examiner

FIG. 8

NONWOVEN APERTURED ELASTIC FILM WITH IMPROVED BONDING FEATURES

BACKGROUND OF THE INVENTION

Nonwoven, elastic composites are commonly incorporated into products (e.g., diapers, training pants, garments, etc.) to improve their ability to better fit the contours of the body. For example, the composite may be formed from an elastic film and one or more nonwoven web materials. The nonwoven web material may be joined to the elastic film while the film is in a stretched condition so that the nonwoven web material can gather between the locations where it is bonded to the film when it is relaxed. The resulting elastic composite is stretchable to the extent that the nonwoven web material gathered between the bond locations allows the elastic film to elongate. Unfortunately, elastic films may be unpleasant and uncomfortable against the wearer's skin. In an effort to improve these properties, attempts have been made to aperture the composite to enhance breathability. The elastic material may be apertured, for example, in various regions coincident the bond sites so that the first and second webs are joined through the apertures. Despite the benefits achieved, however, the process can be time-consuming and thus a need for improvement remains.

SUMMARY OF THE INVENTION

The present invention relates to a nonwoven composite comprising an elastic film bonded to a nonwoven web material at a plurality of discrete bond points, said bond points comprising a total bond area of less than about 25% of the overall nonwoven composite, and wherein said film comprises a plurality of apertures proximately adjacent to said bond points, and wherein said nonwoven composite comprises a plurality of unbonded areas such that the unbonded areas provide unbonded elastic film positioned adjacent to but not fused to said nonwoven web such that the unbonded areas create a tactile pattern in the overall nonwoven composite; said nonwoven composite comprising a number of pattern stamps repeated throughout the composite wherein the pattern stamps are separated at a distance as measured in the CD direction by a band width from about 0.050 inches to about 0.150 inches of the nonwoven composite and as measured in the MD direction by a distance of from about 0.5 inches to about 10.0 inches of the nonwoven composite and wherein the pattern stamps comprise one or more clusters, said cluster comprising at least 3 pins for said bond points, said pins positioned within the cluster as to provide an angular, bi-directional pull of the film around said aperture for enhanced breathability. The nonwoven composite of the present invention may comprise a pattern stamp wherein the pattern resembles a variety of patterns such as flowers, squares, circles, stars, zig-zags, arrows, cartoon characters, faces, balloons, animals, nature, waves, swirls, rectangles, ovals, triangles, diamonds, polygons, and abstract shapes.

BRIEF DESCRIPTION OF THE DRAWINGS

A full and enabling disclosure of the present invention is set forth more particularly in the remainder of the specification, including reference to the accompanying figures, in which:

FIG. 6 is an illustration of a side-by-side comparison of the film retraction patterns that occurs in, 6A an embodiment of a bonding pattern that may be used in accordance with the present invention;

6B a bonding pattern formed by a wire bonding pattern; and 6C a bonding pattern formed by a rib-knit bonding pattern.

DETAILED DESCRIPTION OF THE INVENTION

Definitions

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

The term "pin" or "bonding pin" refers to the element of the roller used to bond or fuse the film to the nonwoven web. The term "pattern factor" defines the relationship between the edge of the angle of the pattern angle and the machine direction spacing of the pins.

As used herein, "pin area" refers to the area of each pin as measured in diameter.

As used herein, "pin aspect ratio" is the length/width ratio of the pins in relation to one another.

As used herein, "pin orientation" refers to the angle of the pin relative to the machine direction axis.

As used herein, "pin shape" is the shape of the pin which may vary depending on the overall pattern desired in the nonwoven composite.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al. Spunbond fibers are generally not tacky when they are deposited onto a collecting surface. Spunbond fibers may sometimes have diameters less than about 40 microns, and are often between about 5 microns to about 20 microns.

As used herein the terms "extensible" or "extensibility" generally refers to a material that stretches or extends in the direction of an applied force by at least about 25%, in some embodiments about 50%, and in some embodiments, at least about 75% of its relaxed length or width. An extensible material does not necessarily have recovery properties. For example, an elastomeric material is an extensible material having recovery properties. A meltblown web may be extensible, but not have recovery properties, and thus, be an extensible, non-elastic material.

As used herein, the term "elastomeric" and "elastic" and refers to a material that, upon application of a stretching force, is stretchable in at least one direction (such as the CD direction), and which upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a one (1) inch sample of a material that is stretchable to at least 1.50 inches and which, upon release of the stretching force, will recover to a length of not more than 1.25 inches. Desirably, the material contracts or recovers at least 50%, and even more desirably, at least 80% of the stretched length.

As used herein, the terms "machine direction" or "MD" generally refers to the direction in which a material is produced with respect to the length of the material. The term "cross-machine direction" or "CD" refers to the direction perpendicular to the machine direction with or the direction with respect to the width of the material.

As used herein, the terms "necked" and "necked material" generally refer to any material that has been drawn in at least one dimension (e.g., machine direction) to reduce its transverse dimension (e.g., cross-machine direction) so that when the drawing force is removed, the material may be pulled back to its original width. The necked material generally has a higher basis weight per unit area than the un-necked material. When the necked material is pulled back to its original width, it should have about the same basis weight as the un-necked material. This differs from the orientation of a film in which the film is thinned and the basis weight is reduced. The necking method typically involves unwinding a material from a supply roll and passing it through a brake nip roll assembly driven at a given linear speed. A take-up roll or nip, operating at a linear speed higher than the brake nip roll, draws the material and generates the tension needed to elongate and neck the material.

As used herein, the term "thermal point bonding" generally refers to a process performed, for example, by passing a material between a patterned roll (e.g., calender roll) and another roll (e.g., anvil roll), which may or may not be patterned. One or both of the rolls are typically heated.

As used herein, the term "ultrasonic bonding" generally refers to a process performed, for example, by passing a material between a sonic horn and a patterned roll (e.g., anvil roll). For instance, ultrasonic bonding through the use of a stationary horn and a rotating patterned anvil roll is described in U.S. Pat. No. 3,939,033 to Grgach, et al., U.S. Pat. No. 3,844,869 to Rust Jr., and U.S. Pat. No. 4,259,399 to Hill, which are incorporated herein in their entirety by reference thereto for all purposes. Moreover, ultrasonic bonding through the use of a rotary horn with a rotating patterned anvil roll is described in U.S. Pat. No. 5,096,532 to Neuwirth, et al., U.S. Pat. No. 5,110,403 to Ehlert, and U.S. Pat. No. 5,817,199 to Brennecke, et_al., which are incorporated herein in their entirety by reference thereto for all purposes. Of course, any other ultrasonic bonding technique may also be used in the present invention.

It is to be noted that the terms "bonding" and "lamination" or "laminating" may be used interchangeably to refer to the process by which the film is affixed to the nonwoven web that results in the enhanced nonwoven composite of the present invention.

DETAILED DESCRIPTION

While the specification concludes with the claims particularly pointing out and distinctly claiming the invention, it is believed that the present invention will be better understood from the following description.

Generally speaking, the present invention relates to a nonwoven composite comprising an elastic film bonded to a nonwoven web at a plurality of strategic, geometric bond points to provide a tactile pattern, enhanced breathability and comfort to the end user. The nonwoven composite comprises an elastic film laminated to one or more nonwoven web materials wherein due to the angles and spacing of the bonding, a voided space is left from the unbonded web area to create a patterned, tactile feature resulting in a nonwoven composite with enhanced breathability. The composite is formed by passing the film through a nip specifically patterned with varying bonding pins specifically oriented and arranged to bond the film to the nonwoven web material(s). Concurrent with bond formation, apertures are also formed in the elastic film. The apertures are of a size sufficient to provide a desired level of texture, softness, hand feel, and/or aesthetic appeal to the composite without having a significant adverse effect on its elastic properties. Aperture and bond formation are accomplished in the present invention by selectively controlling certain parameters of the lamination process, such as film content, bonding pattern, degree of film tension, bonding conditions, etc. Additionally, attention and particular control of the bonding pins, such as bond area, pin angle, pin shape, pin aspect ratio, pin orientation and pin pattern factor allow not only for a pattern of the pins but a resulting pattern within the nonwoven composite created by the voids of the unbonded areas of the nonwoven web. In this regard, various embodiments of the present invention will now be described in more detail.

I. Elastic Film

The elastic film of the present invention is formed from one or more elastomeric polymers that are melt-processable, i.e. thermoplastic. Any of a variety of thermoplastic elastomeric polymers may generally be employed in the present invention, such as elastomeric polyesters, elastomeric polyurethanes, elastomeric polyamides, elastomeric copolymers, elastomeric polyolefins, and so forth. In one particular embodiment, elastomeric semi-crystalline polyolefins are employed due to their unique combination of mechanical and elastomeric properties. That is, the mechanical properties of such semi-crystalline polyolefins allows for the formation of films that readily aperture during thermal bonding, but yet retain their elasticity. Semi-crystalline polyolefins have or are capable of exhibiting a substantially regular structure. For example, semi-crystalline polyolefins may be substantially amorphous in their undeformed state, but form crystalline domains upon stretching. Exemplary semi-crystalline polyolefins include polyethylene, polypropylene, blends and copolymers thereof. Particularly suitable polyethylene copolymers are those that are "linear" or "substantially linear." The term "substantially linear" means that, in addition to the short chain branches attributable to comonomer incorporation, the ethylene polymer also contains long chain branches in that the polymer backbone. "Long chain branching" refers to a chain length of at least 6 carbons. Each long chain branch may have the same comonomer distribution as the polymer backbone and be as long as the polymer backbone to which it is attached.

Although not necessarily required, linear polyethylene "plastomers" are particularly desirable in that the content of α-olefin short chain branching content is such that the ethylene copolymer exhibits both plastic and elastomeric characteristics—i.e., a "plastomer." Because polymerization with α-olefin comonomers decreases crystallinity and density, the resulting plastomer normally has a density lower than that of polyethylene thermoplastic polymers (e.g., LLDPE), but approaching and/or overlapping that of an elastomer. Preferred plastomers for use in the present invention are ethylene-based copolymer plastomers available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al. Of course, the present invention is by no means limited to the use of ethylene polymers. For instance, propylene polymers may also be suitable for use as a semi-crystalline polyolefin. Suitable plastomeric propylene polymers may include, for instance, copolymers or terpolymers of propylene include copolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, and in some embodiments, from about 2 wt. % to about 10 wt. %. Preferably, the density of the polypropylene (e.g., propylene/α-olefin copolymer) may be 0.91 grams per cubic centimeter (g/cm$^3$) or less, in some embodiments, from 0.85 to 0.88 g/cm$^3$, and in some embodiments, from 0.85 g/cm$^3$ to 0.87 g/cm$^3$. Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al.

Of course, other thermoplastic polymers may also be used to form the elastic film, either alone or in conjunction with the semi-crystalline polyolefins. For instance, a substantially amorphous block copolymer may be employed that has at least two blocks of a monoalkenyl arene polymer separated by at least one block of a saturated conjugated diene polymer. The monoalkenyl arene blocks may include styrene and its analogues and homologues, such as o-methyl styrene; p-methyl styrene; p-tert-butyl styrene; 1,3 dimethyl styrene p-methyl styrene; etc., as well as other monoalkenyl polycyclic aromatic compounds, such as vinyl naphthalene; vinyl anthrycene; and so forth. Preferred monoalkenyl arenes are styrene and p-methyl styrene. The conjugated diene blocks may include homopolymers of conjugated diene monomers, copolymers of two or more conjugated dienes, and copolymers of one or more of the dienes with another monomer in which the blocks are predominantly conjugated diene units. Preferably, the conjugated dienes contain from 4 to 8 carbon atoms, such as 1,3 butadiene (butadiene); 2-methyl-1,3 butadiene; isoprene; 2,3 dimethyl-1,3 butadiene; 1,3 pentadiene (piperylene); 1,3 hexadiene; and so forth.

Particularly suitable thermoplastic elastomeric copolymers are available from Kraton Polymers LLC of Houston, Tex. under the trade name KRATON®. Still other suitable copolymers include the S-I-S and S-B-S elastomeric copolymers available from Dexco Polymers of Houston, Tex. under the trade designation VECTOR®. Also suitable are polymers composed of an A-B-A-B tetrablock copolymer, such as discussed in U.S. Pat. No. 5,332,613 to Taylor, et al.

Besides polymers, the elastic film of the present invention may also contain other components as is known in the art. In one embodiment, for example, the elastic film contains a filler. Fillers are particulates or other forms of material that may be added to the film polymer extrusion blend and that will not chemically interfere with the extruded film, but which may be uniformly dispersed throughout the film. Fillers may serve a variety of purposes, including enhancing film opacity and/or breathability (i.e., vapor-permeable and substantially liquid-impermeable). For instance, filled films may be made breathable by stretching, which causes the polymer to break away from the filler and create microporous passageways. Breathable microporous elastic films are described, for example, in U.S. Pat. Nos. 5,997,981; 6,015,764; and 6,111,163 to McCormack, et al.; U.S. Pat. No. 5,932,497 to Morman, et al.; U.S. Pat. No. 6,461,457 to Taylor, et al. Examples of suitable fillers include, but are not limited to, calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives. Other additives may also be incorporated into the film, such as melt stabilizers, processing stabilizers, heat stabilizers, light stabilizers, antioxidants, heat aging stabilizers, whitening agents, antiblocking agents, bonding agents, tackifiers, viscosity modifiers, etc.

The elastic film of the present invention may be mono- or multi-layered. Multilayer films may be prepared by co-extrusion of the layers, extrusion coating, or by any conventional layering process. Such multilayer films normally contain at least one base layer and at least one skin layer, but may contain any number of layers desired. For example, the multilayer film may be formed from a base layer and one or more skin layers, wherein the base layer is formed from a semi-crystalline polyolefin. In such embodiments, the skin layer(s) may be formed from any film-forming polymer. If desired, the skin layer(s) may contain a softer, lower melting polymer or polymer blend that renders the layer(s) more suitable as heat seal bonding layers for thermally bonding the film to a nonwoven web. For example, the skin layer(s) may be formed from an olefin polymer or blends thereof, such as described above. Additional film-forming polymers that may be suitable for use with the present invention, alone or in combination with other polymers, include ethylene vinyl acetate, ethylene ethyl acrylate, ethylene acrylic acid, ethylene methyl acrylate, ethylene normal butyl acrylate, nylon, ethylene vinyl alcohol, polystyrene, polyurethane, and so forth.

II. Nonwoven Web Material

The polymers used to form the nonwoven web material typically have a softening temperature that is higher than the temperature imparted during bonding. In this manner, the polymers do not substantially soften during bonding to such an extent that the fibers of the nonwoven web material become completely melt flowable. For instance, polymers may be employed that have a Vicat softening temperature (ASTM D-1525) of from about 100° C. to about 300° C., in some embodiments from about 120° C. to about 250° C., and in some embodiments, from about 130° C. to about 200° C. Exemplary high-softening point polymers for use in forming nonwoven web materials may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. If desired, biodegradable polymers, such as those described above, may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth. Monocomponent and/or multicomponent fibers may be used to form the nonwoven web material.

Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U. S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

Although any combination of polymers may be used, the polymers of the multicomponent fibers are typically made from thermoplastic materials with different glass transition or melting temperatures where a first component (e.g., sheath) melts at a temperature lower than a second component (e.g., core). Softening or melting of the first polymer component of the multicomponent fiber allows the multicomponent fibers to form a tacky skeletal structure, which upon cooling, stabilizes the fibrous structure.

If desired, the nonwoven web material used to form the nonwoven composite may have a multi-layer structure. Suitable multi-layered materials may include, for instance, spunbond/meltblown/spunbond (SMS) laminates and spunbond/meltblown (SM) laminates. Various examples of suitable SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al. In addition, commercially available SMS laminates may be obtained from Kimberly-Clark Corporation under the designations Spunguard® and Evolution®.

Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above.

A nonwoven web material may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven web. Hydraulically entangled nonwoven webs of staple length and continuous fibers are disclosed, for example, in U.S. Pat. No. 3,494,821 to Evans and U.S. Pat. No. 4,144,370 to Boulton. Hydraulically entangled composite nonwoven webs of a continuous fiber nonwoven web and a pulp layer are disclosed, for example, in U.S. Pat. No. 5,284,703 to Everhart, et al. and U.S. Pat. No. 6,315,864 to Anderson, et al.

Although not required, the nonwoven web material may be necked in one or more directions prior to bonding to the film of the present invention. Suitable techniques necking techniques are described in U.S. Pat. Nos. 5,336,545, 5,226,992, 4,981,747 and 4,965,122 to Morman, as well as U.S. Patent Application Publication No. 2004/0121687 to Morman, et al. Alternatively, the nonwoven web may remain relatively inextensible in at least one direction prior to bonding to the film. In such embodiments, the nonwoven web may be optionally stretched in one or more directions subsequent to bonding to the film.

III. Bonding, Apertures and Patterns

The advantages of the present invention can be mostly appreciated by way of the one-step bonding and aperturing process that creates a unique characteristic to the film resulting in a textile pattern in the overall nonwoven composite. Such characteristics include, but are not limited to, improved air permeability that maintains the strength and elastic properties of the aperture film and enhanced tactile features.

To concurrently form apertures and bonds between the film and the nonwoven web material, bonding is generally accomplished in the present invention via a patterned bonding technique (e.g., thermal point bonding, ultrasonic bonding, etc.) in which the materials are supplied to a nip defined by at least one patterned roll. Thermal point bonding, for instance, typically employs a nip formed between two rolls, at least one of which is patterned. Ultrasonic bonding, on the other hand, typically employs a nip formed between a sonic horn and a patterned roll. Regardless of the technique chosen, the patterned roll contains a plurality of raised bonding pins to concurrently bond the film to the nonwoven web material(s) and form apertures in the film as a one step process and in accordance to the geometric angles, orientation, formulations and the like of the present invention.

The size and shape of the bonding pins may be specifically tailored to facilitate the formation of apertures in the film, enhance bonding between the film and the nonwoven material(s) and create the resulting pattern of the nonwoven composite. For example, the bonding pins may have a length of from about 300 to about 5000 micrometers, in some embodiments from about 500 to about 4000 micrometers, and in some embodiments, from about 1000 to about 2000 micrometers. The width dimension of the bonding pins may likewise range from about 20 to about 500 micrometers, in some embodiments from about 40 to about 200 micrometers, and in some embodiments, from about 50 to about 150 micrometers. The overall area of the pin should be from about 0.0004 in$^2$ to about 0.005 in$^2$, in some embodiments from about 0.004 in$^2$ to about 0.0025 in$^2$, in some embodiments from about 0.007 in$^2$ to about 0.0025 in$^2$, and in some embodiments from about 0.004 in$^2$ to about 0.007 in$^2$. The pin shape can vary including but not limited to circles, oval, rectangles, stars, squares, and the like. In addition, the "pin aspect ratio" (the ratio of the length of a pin to its width) may range from about 1 to about 1.5, in some embodiments from about 1 to about 2, in some embodiments from about 1.2 to about 5, and in some embodiments from about 2 to about 4.

Besides the size of the bonding pins, the overall bonding pattern may also be selectively controlled to achieve the desired aperture and resulting pattern in the overall nonwoven composite. For example, the bonding pattern is selected in which the longitudinal axis (longest dimension along a center line of the element) of one or more of the bonding pins is oriented relative to the machine direction ("MD") of the elastic film. The orientation of the pins is critical to not only how the bond points occur between the film and the nonwoven web but determines the way in which the film apertures and the unbonded film twists and retracts to force the unbonded nonwoven web of the composite to have a physical void resulting in a tactile pattern of the composite. In addition to the functional, tactile nonwoven web, the angle of the pins creates advantageously larger apertures within the film thereby increasing breathability without the need to increase the bond area resulting in a softer and more drapeable elastic laminate.

Figure 1:
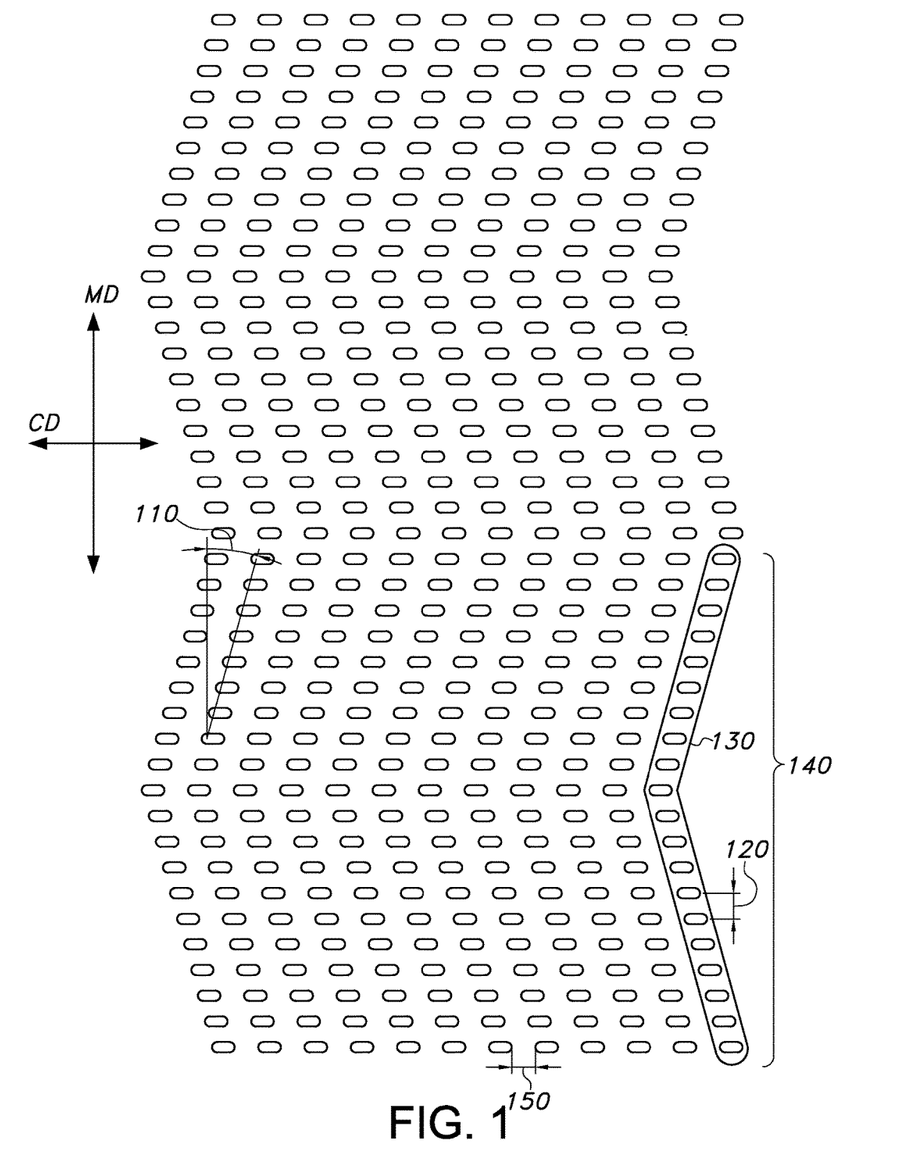
FIG. 1 illustrates one embodiment of a bonding pattern that may be used in accordance with the present invention.
Figures 2, 2A:
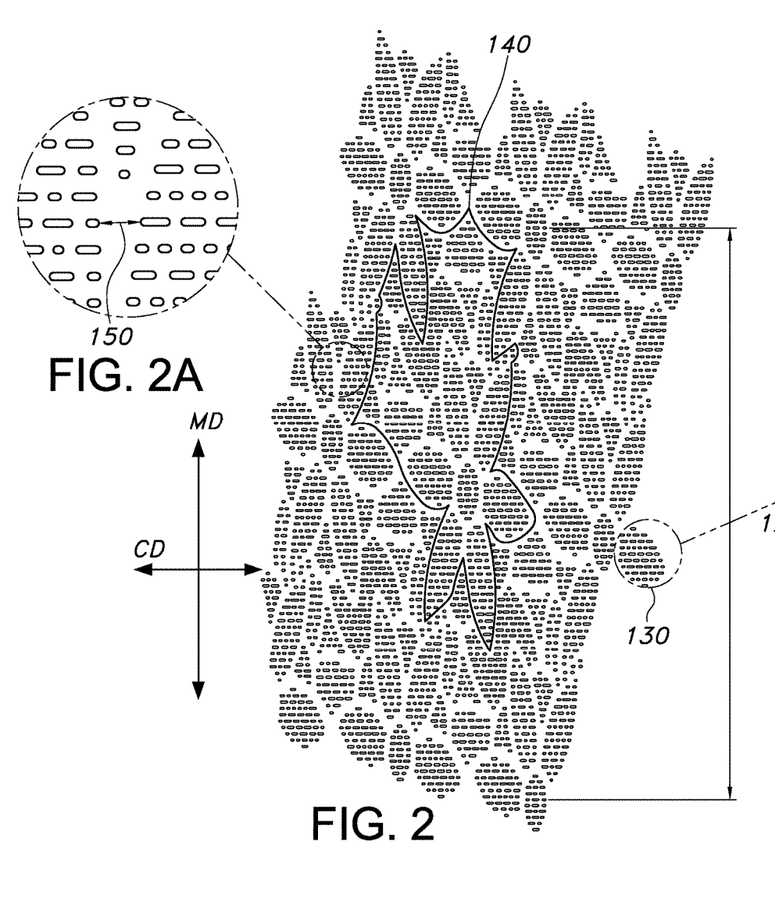
FIG. 2 illustrates another embodiment of a bonding pattern that may be used in accordance with the present invention.
Figure 2B:
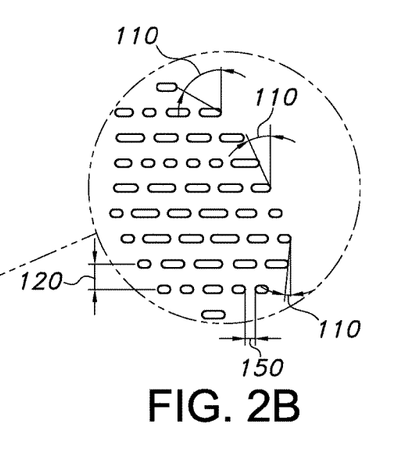

The present invention improves efficiency in the bonding process by reducing the overall bond points by about 4-5 times the number of pins currently used in bonded nonwoven composites. For example, the present invention may necessitate approximately 70-75 pins/in$^2$ compared to, for example, a wire-weave pattern that may necessitate approximately 315-325 pin/in$^2$. Normally, increased breathability would be created by increasing the number of pins and thus increasing the number of apertures. The present invention provides, however, the ability to focus specifically on the orientation and spacing of pins such that a "pattern factor" or "PF" provides a functional formula to reduce the number of bond points, reduce apertures and still increase permeability or breathability of the film. The pattern factor as described herein refers to the relationship between the "pattern angle" or "PA" 110 and the machine direction spacing of the pins 120. As shown in FIGS. 1 and 2, the pattern angle 110 is the angle from the edge of one pin to the edge of another proximate pin on the pattern. Ideally, the PA 110 is greater than about 10 degrees and the spacing is greater than about 0.040 inches. The pattern angle 110 can be found by measuring from the outer edge of and between two adjacent pins within a cluster 130 in the MD direction. A "cluster" 130, as used herein, is at least 3 pins within close proximity to each other. A cluster is never longer in the MD than the overall MD length of one complete "pattern stamp" 140. A "pattern stamp" as used herein refers to the cluster or number of clusters that appear as a pattern that is continuously repeated throughout the nonwoven composite. A cluster, thus, does not go on forever and ever but is rather a defined set of pins within a pattern in the MD direction as shown in a magnified view in FIG. 2A and FIG. 2B. In the CD direction, however, a cluster 130 can be simply one pin or a series of pins. The CD spacing of pins, referred herein as a band width 150, of pins within a cluster 130 is from about 0.015 inches to about 0.040 inches, in some embodiments from about 0.020 inches to about 0.038 inches, and in some embodiments from about 0.025 inches apart. Looking at both the MD and the CD direction of the nonwoven composite of the present invention, as shown in both FIGS. 1 and 2, the pattern stamp 140, is the group of pins that creates the pattern that can be seen continuously repeated in the overall material. The pattern stamp 140 can comprise of one cluster 130 as shown in FIG. 1 or several clusters 130 as shown in FIG. 2. If you were to take a select pattern stamp 140 of pins and continuously lay the pattern repeatedly over the material, you will see the pattern repeat over and over again. The length of the pattern stamp 140 as measured in the MD should be from about 0.5 inches to about 10.0 inches, in some embodiments from about 0.75 inches to about 8.0 inches, and in some embodiments from about 1.0 inches to about 7.0 inches.

The following formula is used as a novel means for determining an improvement to obtaining the nonwoven composite of the present invention that achieves the overall advantages desired:

$$PF=(PA/15+D^2/0.0081)$$

The PF of the present invention should be from about 1.15 to about 4.0, in some embodiments from about 1.25 to about 2.9 and in some embodiments from about 1.5 to about 2.5. Clusters such as those seen in FIG. 2 with generally curved outer boundaries, will have multiple PA measurements within the cluster resulting in multiple PF results. On non-linear, but not limited to curved, patterns, the PF will be such that only at least 60% of the PFs calculated will be from about 1.15 to about 4.0, in some embodiments from about 1.25 to about 2.9 and in some embodiments from about 1.5 to about 2.5. Thus, in non-linear patterns, when the PA is below 10 degrees, about 40% of the PFs may fall outside of the foregoing PF calculations of the present invention.

The bonding points of the present invention stem from the strategic placement of the pins within a cluster 130 that causes an overall response in the unbonded film and unbonded nonwoven web to create a pattern. The overall pattern can be broken down into how the clusters 130 are oriented in such a way to create the void that ultimately repeats a number of times throughout the composite as the pattern stamp 140. The unbonded and unapertured portion of the film may appear as small strands of film within the composite as a result of the film not being bonded to the web. The distance between the overall pattern stamps 140 may vary depending on the overall pattern sought. Depending on the direction measured, the pattern stamps 140 will have a particular distance of space found between the clusters 130. An elastic band width 150 measures the distance between the edges of the two closest pins measured between two adjacent clusters 130 by way of CD. The clusters are spaced apart from each other at a band width 150 from about 0.050 inches to about 0.150 inches may be from about 0.050 inches to about 0.150 inches, in some embodiments from about 0.060 inches to about 0.120 inches and in some embodiments from about 0.065 inches to about 0.090 inches. The pattern stamp 140 distance measures the distance between the edges of the two closest pins measured between two adjacent pattern stamps 140 by way of MD. It is the distance at which the pattern is repeated throughout the nonwoven composite. The pattern stamp 140 distance of the present invention may be from about 0.25 inches to about 10 inches, in some embodiments from about 0.5 inches to about 5.0 inches, in some embodiments from about 0.25 inches to about 1.0 inches, and in some embodiments from about 1.0 inches to about 2.5 inches. So, for further example, as shown in FIG. 1, a pattern wherein the unbonded areas resemble a zig-zag, the pattern stamp 140 may repeat according to the distances just stated.

It is to be noted that the aperture is created by the orientation of the pins relative to the machine direction. The pin orientation, therefore, is from about 60 degrees to about 125 degrees, in some embodiments from about 70 degrees to about 110 degrees, and in some embodiments about 90 degrees. The spacing of the pins and thus, the spacing of the bond points, may be from about 0.025 inches to about 0.050 inches apart, in some embodiments from about 0.035 inches to about 0.045 inches apart, and in some embodiments from about 0.040 inches apart.

The bonding patterns of the present invention show tremendous improvements over prior patterns such as the "S-weave" pattern as described in U.S. Pat. No. 5,964,742 to McCormack, et al., the "rib-knit" pattern as described in U.S. Pat. No. 5,620,779 to Levy, et al., the "wire weave" pattern, or those described in U.S. Pat. No. 3,855,046 to Hansen et al.; U.S. Pat. No. 5,962,112 to Haynes et al.; U.S. Pat. No. 6,093,665 to Sayovitz et al.; D375,844 to Edwards, et al.; D428,267 to Romano et al.; and D390,708 to Brown.

Figure 3:
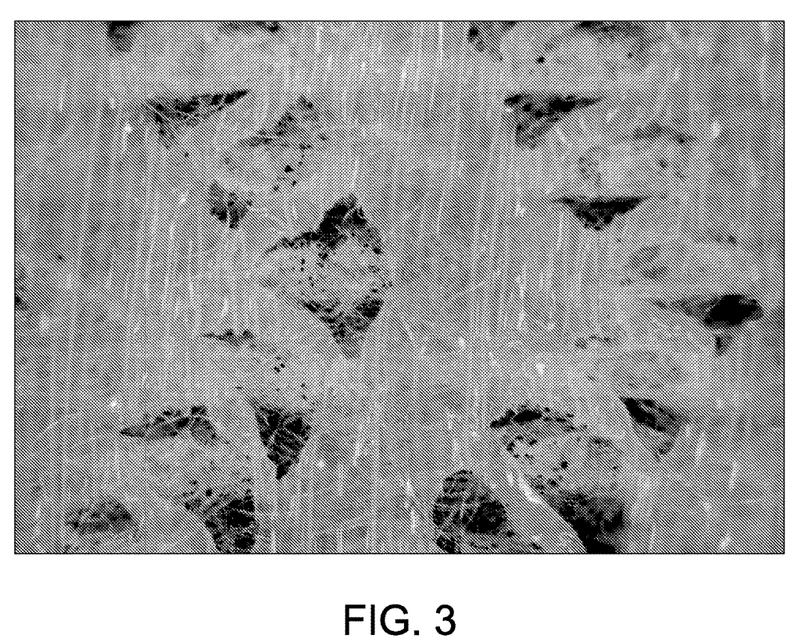
FIG. 3 is an SEM microphotograph (5 kv, 60×) of a sample formed in Example 1, showing apertures in the elastic film formed by one embodiment of a bonding pattern that may be used in accordance with the present invention.
Figure 4:
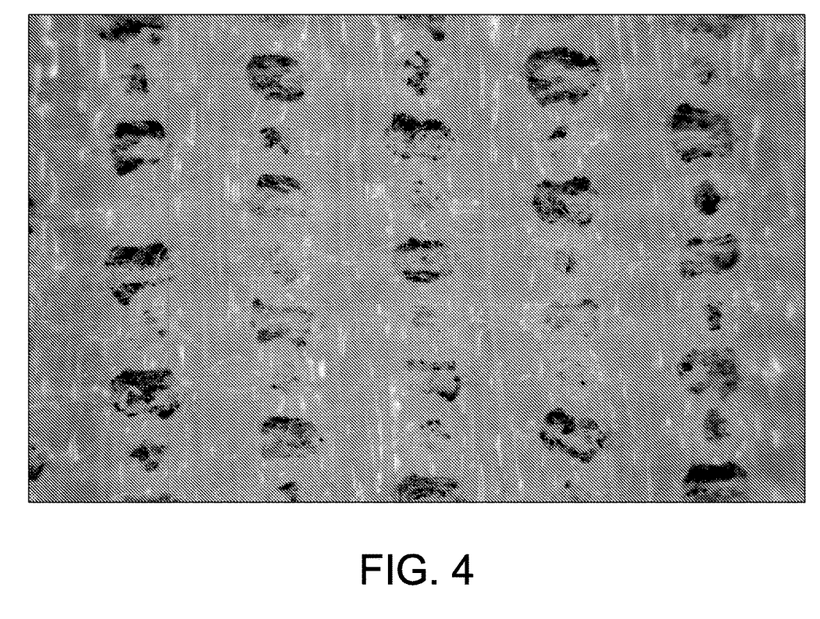
FIG. 4 is an SEM microphotograph (5 kv, 60×) showing apertures in the elastic film formed by the bars of a wire weave bonding pattern.
Figure 5:
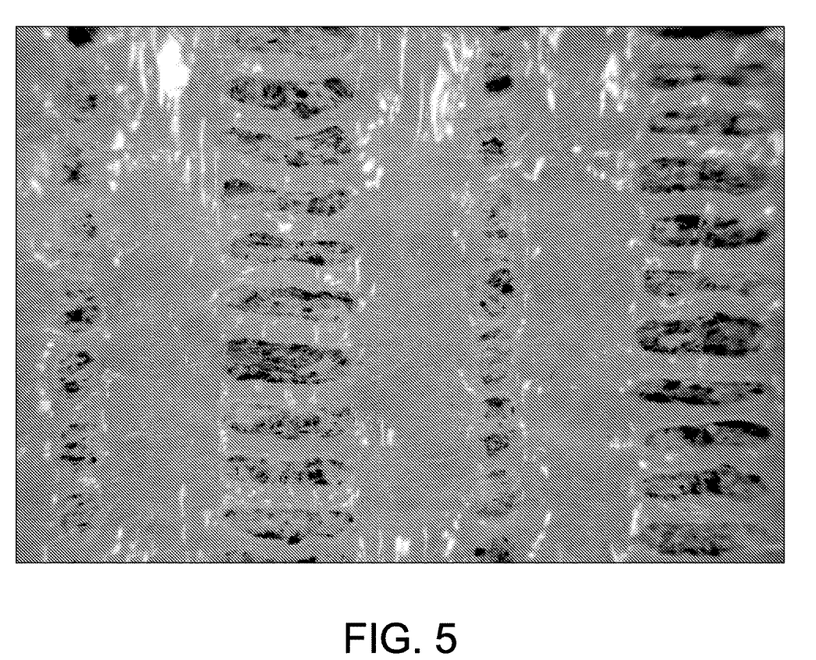
FIG. 5 is an SEM microphotograph (5 kv, 60×) showing apertures in the elastic film formed by the bars of a rib-knit bonding pattern.
Figure 6A:
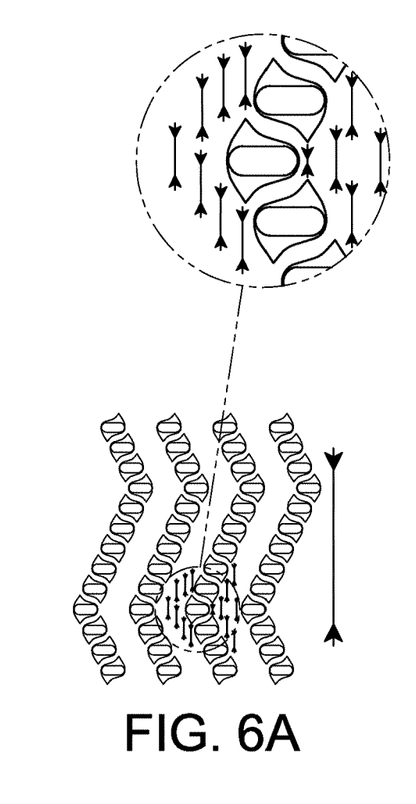
Figure 6B:
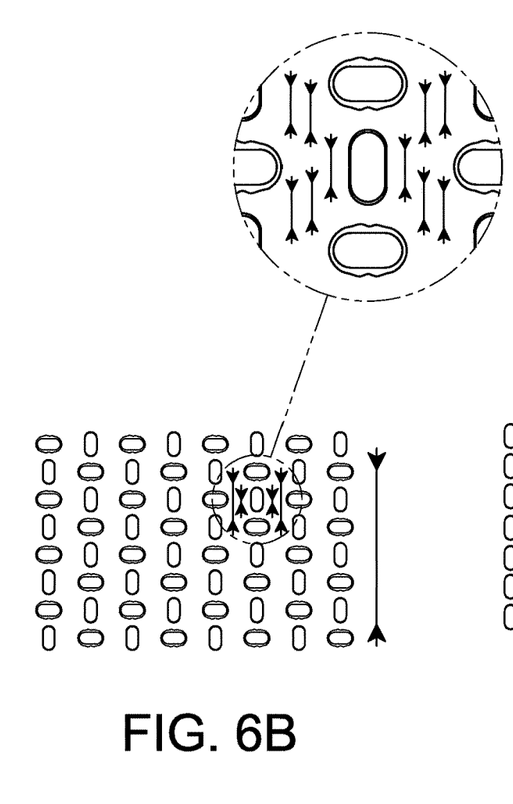
Figure 6C:
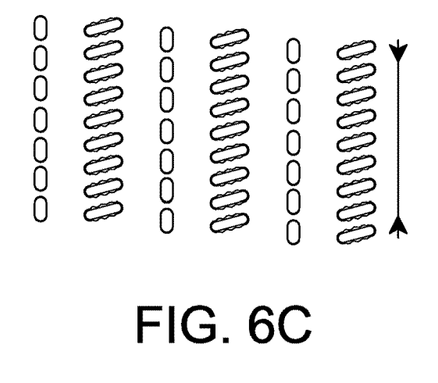
Figure 7:
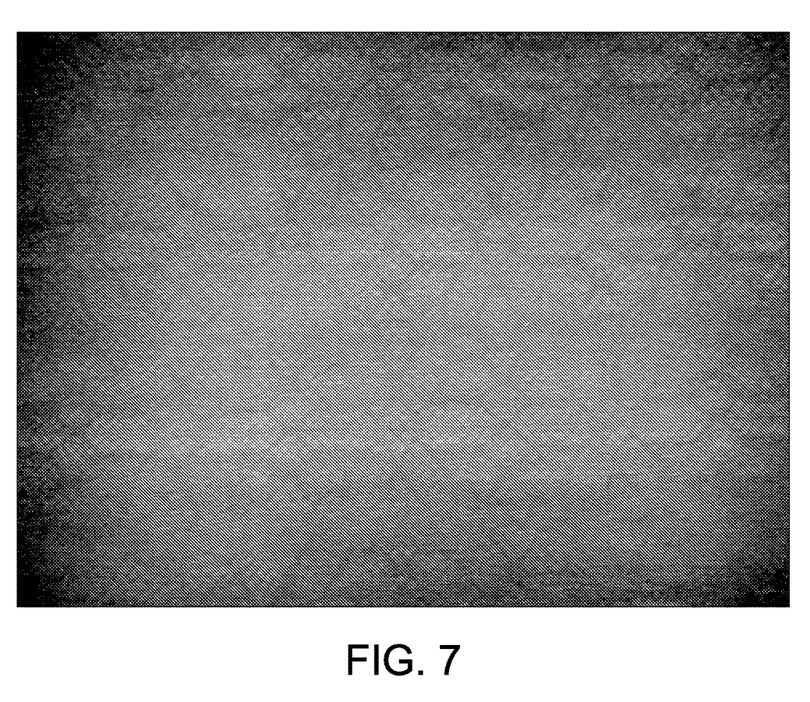
FIG. 7 is an SEM microphotograph (5 kv, 60×) showing a nonwoven composite made in accordance with an embodiment of improved bonding features of the present invention.

The selection of an appropriate bonding temperature (e.g., the temperature of a heated roll) will help melt and/soften the low-softening point elastomeric polymer(s) of the film at regions adjacent to the bonding pins. The softened elastomeric polymer(s) may then flow and become displaced during bonding, such as by pressure exerted by the bonding pins. The displaced portions of the film surrounding the apertures can also fuse to the nonwoven web material(s), thereby forming an integral nonwoven composite. Furthermore, because the elastomeric polymer(s) may physically entrap or adhere to the fibers at the bond sites, adequate bond formation may be achieved without requiring substantial softening of the polymer(s) used to form the nonwoven web material. Various portions of the nonwoven web material remains substantially unbonded to the film or other materials at those regions located directly adjacent to (e.g. above or below) the apertures as directed by the desired placement, orientation and angles of the pins. The placement of the pins is critical to the overall enhancement and advantages of the present invention. In fact, the total bond area of the present invention is lower than preceding bonding methods such that it provides higher permeability with up to about 2.5 times increased breathability of other aperture films which, results in increased comfort of the resulting nonwoven composite of the present invention. The nonwoven composite has a total bond area of less than about 25% (as determined by conventional optical microscopic methods), and in some embodiments, less than about 20%. For example, the nonwoven composite may have a total bond area of between about 5% to about 25%, in some embodiments from about 8% to about 20%, and in some embodiments from about 10% to about 16%. By concentrating on specific aspects of the pin such as placement, angle, orientation, spacing, and the geometric calculations of the relationship of those aspects, the present invention provides an improved nonwoven composite that enhances breathability yet does so in a unique and efficient way as to not create more apertures or increase bond area. FIG. 3 illustrates one embodiment of a multi-layer nonwoven composite of the present invention showing a film atop a nonwoven material. As shown, the film is torqued by an angular, bi-directional pull around the apertures. Due to the bond offsets, the film retraction pulls larger openings and at various points around the apertures. This is a contrast to the linear, mono-directional pull of the film shown in FIG. 4 as is typically done in a wire-weave bonding pattern. Because of the elements taught by the invention, the aperture is able to be larger than the bond point itself and increases the opening of the film beyond its normal size. In FIG. 4, it is shown smaller bonding points with no angular, bi-directional force. In the present invention, as a result of the angular, bi-directional pull on the film, after bonding, the non-bonded areas of the film in the present invention retracts to cause the resulting tactile pattern. FIG. 5 also shows the linear, mono-directional pull as shown in a rib-knit pattern. In this bonding pattern, the film acts similarly to wire-weave and fails to retract at multiple areas around the apertures to cause the angular opening needed for enhanced breathability. Thus, it is not enough to create a pattern of bond points with a shape or pattern as described in U.S. Pat. No. 6,093,665 to Sayovitz, et al. or as describe in U.S. Patent Application Publication No. 2004/0241399 to Marman, et al. because the film does not retract in an angular, bi-directional pull to give the substantial torque on the apertures needed to improve breathability. FIG. 6 illustrates a side-by-side comparison of all of the patterns highlighting the areas of film retraction as shown by the arrows. FIG. 6A is one embodiment of the present invention while FIG. 6B illustrates a wire-weave pattern and FIG. 6C illustrates a rib-knit pattern. It is also noticeable that the pins/int are less in FIG. 6A of the present invention in comparison to FIGS. 6B and 6C of prior patterns. This is another advantage in that the total bond area of the present invention is less than 25% yet provides more breathability than prior patterns.

To achieve the efficient and concurrent aperture and bond formation without substantially softening the polymer(s) of the nonwoven web material and thus decrease its strength/integrity, the bonding temperature and pressure may be selectively controlled. For example, one or more rolls may be heated to a surface temperature of from about 50° C. to about 160° C., in some embodiments from about 60° C. to about 140° C., and in some embodiments, from about 70° C. to about 120° C. Likewise, the pressure exerted by rolls ("nip pressure") during thermal bonding may range from about 75 to about 600 pounds per linear inch, in some embodiments from about 100 to about 400 pounds per linear inch, and in some embodiments, from about 120 to about 200 pounds per linear inch. Of course, the residence time of the materials may influence the particular bonding parameters employed.

As stated, another factor that influences concurrent aperture and bond formation is the degree of tension in the film during bonding. An increase in film tension, for example, typically correlates to an increase in aperture size. Of course, a film tension that is too high may adversely affect the integrity of the film. Thus, in most embodiments of the present invention, a stretch ratio of about 1.5 or more, in some embodiments from about 2.5 to about 7.0, and in some embodiments, from about 3.0 to about 5.5, is employed to achieve the desired degree of tension in the film during lamination. The stretch ratio may be determined by dividing the final length of the film by its original length. The stretch ratio may also be approximately the same as the draw ratio, which may be determined by dividing the linear speed of the film during lamination (e.g., speed of the nip rolls) by the linear speed at which the film is formed (e.g., speed of casting rolls or blown nip rolls).

The film may be "pre-stretched" (prior to bonding) by rolls rotating at different speeds of rotation so that the sheet is stretched to the desired stretch ratio in the machine direction. This uniaxially stretched film may also be oriented in the cross-machine direction to form a "biaxially stretched" film. The orientation temperature profile during the "pre-stretching" operation is generally below the melting point of one or more polymers in the film, but high enough to enable the composition to be drawn or stretched. For example, the film may be stretched at a temperature from about 15° C. to about 50° C., in some embodiments from about 25° C. to about 40° C., and in some embodiments, from about 30° C. to about 40° C. When "pre-stretched" in the manner described above, the degree of stretch during lamination may be increased, maintained, or slightly reduced (retracted) to desired degree of tension. Various articles may employ the embodiments of the present invention. Such articles may include, but are not limited to, diapers, incontinence articles, feminine care articles, wipes (baby wipes, sanitizer wipes, floor wipes, hand wipes, etc. . . . ), surgical gowns, hospital bed liners, and the like.

The advantages of the present invention are improved permeability and enhanced tactile properties that create better comfort to the end user. The efficiency in manufacturing is also enhanced as the number of bond points decreases which may reduce overall costs and performance in making the resulting composite. Additionally, the process of manufacturing the nonwoven composite of the present invention occurs in one step which aids in general efficiency. Overall, the present invention is an improvement to existing bonded materials resulting in a nonwoven composite and article that is pleasing to the end consumer. A variety of patterns can be seen in the overall nonwoven composite. Such patterns may include, but are not limited to, flowers, squares, circles, stars, zig-zags, arrows, cartoon characters, faces, balloons, animals, nature, waves, swirls, rectangles, ovals, triangles, diamonds, polygons, and abstract shapes, and the like. It is important to note that the pattern of the present invention is also not created through embossing techniques or by press-welded lines as described in as U.S. Patent Application Publication No. 2001/0008683 to Takai, et al. Rather, the present invention provides a novel way in which the voids, i.e. the unbonded areas of film and nonwoven web, provide the resulting patterns and the bi-directional pull on the film to increase breathability and improve comfort to the end user.

The present invention may be better understood with reference to the following example.

EXAMPLE

The following example further describes and demonstrates an embodiment within the scope of the present invention. The example is given solely for the purpose of illustration and is not to be construed as a limitation of the present invention, as many variations thereof are possible without departing from the spirit and scope of the invention.

Example 1

The elastic film was formed from 98 wt. % of VISTA-MAXX™ 6102FL (ExxonMobil Chemical Co.) and 2 wt. % of SCC 79594 pigment concentrate (Standridge Color Corp.). VISTAMAXX™ 6102FL is a olefinic polypropylene elastomer composed of isotactic propylene units with random ethylene distribution of about 16% having a density of 0.862 grams per cubic centimeter, a Vicat softening temperature of 126° F. (53° C.), and a melt index of 3.0 grams per 10 minutes (190° C., 2.16 kg). The SCC 79594 pigment contained titanium dioxide and other pigments to achieve a targeted tan color in a blended letdown with polypropylene resin (Exxon 3155).

Figure 8:
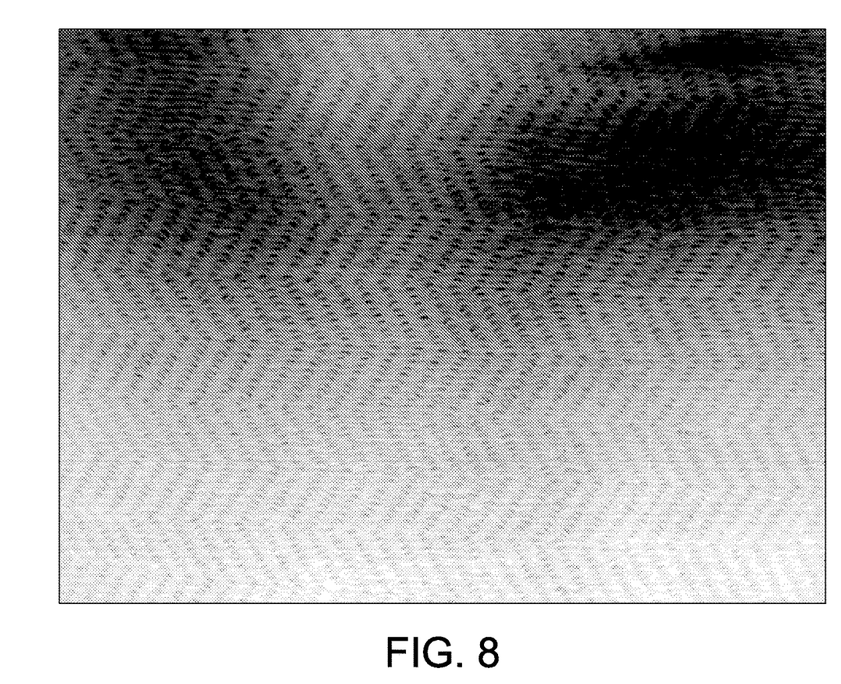
FIG. 8 is an SEM microphotograph (5 kv, 60×) showing a nonwoven composite made in accordance with another embodiment of improved bonding features of the present invention.

After compounding, the polymer composition was extruded at a melt temperature of 403° F. and cast onto a chill roll (set to a temperature of 60° F.) operating at a speed of about 50 feet per minute. The film was then thermally bonded between two polypropylene spunbond facings having a basis weight of approximately about 15 grams per square meter. Specifically, the film and facings were fed between an anvil and patterned roll with an oval shaped pin having an area of 0.0015 int and an aspect ratio of 2.38. The pins were oriented to 90 degrees with a pattern angle of 15 degrees and MD pin spacing of 0.093", both leading to a Pattern Factor of 2.07 and a total bond area of 11.0%. The elastic band width of the clusters within the pattern measured to 0.088". The pattern stamp repeated at a distance of 1.83". The patterned roll was heated to a roll surface temperature of 250° F., the anvil roll was heated to a roll surface temperature of 250° F., and the pressure was 33 pounds per inch. The anvil and pattern rolls operated at a speed of 238 feet per minute so that the film was stretched in the machine direction at a stretch ratio of about 4.8 (i.e., 4.8 times its original length). Finally, the composite was transferred to a winder, which operated at a speed of 108 feet per minute to allow the composite to retract. The final basis weight was approximately 96 grams per square meter with 35 grams per square meter being comprised of the VISTA-MAXX pigmented elastic film blend. The resulting nonwoven composite is shown as FIG. 8.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A nonwoven composite comprising an elastic film bonded to a nonwoven web material at a plurality of discrete bond points, said bond points comprising a total bond area of less than about 25% of the nonwoven composite, and wherein said film comprises a plurality of apertures proximately adjacent to said bond points, and wherein said nonwoven composite comprises a plurality of unbonded areas such that the unbonded areas provide unbonded elastic film positioned adjacent to but not fused to said nonwoven web such that the unbonded areas create a tactile pattern in the nonwoven composite; said nonwoven composite comprising a number of pattern stamps repeated throughout the composite wherein the pattern stamps are separated at a distance as measured in the CD by a band width from about 0.050 inches to about 0.150 inches of the nonwoven composite and as measured in the MD have a length of from about 0.5 inches to about 10.0 inches and wherein the pattern stamps comprises a pattern made from one or more clusters, said one or more clusters comprising at least 3 of said bond points, said bond points forming the cluster have a pattern angle greater than about 10 degrees relative to the MD and wherein each of said bond points in said cluster (i) has an aspect ratio between about 1.2 to about 5, (ii) is oriented in a direction which is at an angle of between about 60 and 125 degrees relative to the MD (iii) has an aperture proximately adjacent thereto and (iv) has opposed first and second lengthwise edges and wherein the aperture extends in the MD proximately adjacent at least one of said first and second lengthwise edges and further wherein apertures adjacent one of the first and second lengthwise edges of the bond points in the cluster are asymmetrically extending a distance furthest from the bond point in the MD along an end portion of the bond point.

2. The nonwoven composite of claim 1 wherein the pattern stamp continuously repeats at a distance from about 0.25 inches to about 10 inches.

3. The nonwoven composite of claim 1 wherein the pattern comprises a pattern factor as calculated by the formula: $PF=(PA/15+D^2/0.0081)$, wherein PA measures the pattern angle and D measures the machine direction spacing of the bond points, and wherein said pattern factor is from about 1.15 to about 4.

4. The nonwoven composite of claim 3 wherein D is from about 0.025 inches to about 0.050 inches.

5. The nonwoven composite of claim 3 wherein at least 60% of the PFs calculated within the pattern equates to about 1.15 to about 4.

6. The nonwoven composite of claim 1 wherein the pattern of the pattern stamp is selected from flowers, circles, stars, zig-zags, arrows, faces, balloons, animals, waves, swirls, ovals, and polygons.

7. The nonwoven composite of claim 1 wherein the CD spacing of the bond points within a cluster is from about 0.015 inches to about 0.040 inches apart.

8. The nonwoven composite of claim 1 wherein said bond points have a length from about 300 to about 5000 micrometers and a width of from about 20 to about 500 micrometers.

9. The nonwoven composite of claim 8 wherein the area of the bond points is between about 0.0004 square inches and about 0.005 square inches.

10. The nonwoven composite of claim 9 wherein the MD spacing of the bond points is between about 0.050 inches and about 0.150 inches.

11. The nonwoven composite of claim 10 wherein said apertures are larger than the proximately adjacent bond point.

12. The nonwoven composite of claim 1 wherein said apertures are larger than the proximately adjacent bond point.

13. The nonwoven composite of claim 1 wherein the MD spacing of the bond points is between about 0.050 inches and about 0.150 inches.

14. The nonwoven composite of claim 1 wherein the CD spacing of the bond points is between about 0.020 and about 0.038 inches.

15. The nonwoven composite of claim 1 wherein the orientation of the bond point is between about 70 and about 110 degrees realtive to the MD.

16. The nonwoven composite of claim 1 wherein the bond points within the cluster have opposed first and second lengthwise edges and the apertures extend in the MD proximately adjacent both of said first and second lengthwise edges.

17. The nonwoven composite of claim 1 wherein each of the bond points in the cluster has an aspect ratio between about 2 and about 4.

* * * * *